(12) United States Patent
Scott et al.

(10) Patent No.: US 11,861,293 B1
(45) Date of Patent: Jan. 2, 2024

(54) METHOD AND SYSTEM FOR DISPLAYING ITEMS

(71) Applicant: Amazon Technologies, Inc., Seattle, WA (US)

(72) Inventors: Sean Michael Scott, Sammamish, WA (US); Douglas J. Gradt, Seattle, WA (US); Doug Irvine, Seattle, WA (US); Nimrod Hoofien, Seattle, WA (US); Eva Manolis, Bellevue, WA (US); Christopher J. Vigder, Mercer Island, WA (US); Amy Bates, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 16/706,277

(22) Filed: Dec. 6, 2019

Related U.S. Application Data (63) Continuation of application No. 14/791,818, filed on Jul. 6, 2015, now Pat. No. 10,515,140, which is a continuation of application No. 11/694,726, filed on Mar. 30, 2007, now Pat. No. 9,075,492.

(51) Int. Cl.
| | | |
|---|---|---|
| *G06F 40/134* | (2020.01) | |
| *G06F 3/04842* | (2022.01) | |
| *G06F 3/0481* | (2022.01) | |
| *G06F 3/04817* | (2022.01) | |

(52) U.S. Cl.
CPC .......... *G06F 40/134* (2020.01); *G06F 3/0481* (2013.01); *G06F 3/04817* (2013.01); *G06F 3/04842* (2013.01); *G06F 2203/04806* (2013.01)

(58) Field of Classification Search
CPC .. G06F 40/134; G06F 3/0481; G06F 3/04817; G06F 3/04842; G06F 2203/04806
See application file for complete search history.

(56) References Cited

U.S. PATENT DOCUMENTS

| | | |
|---|---|---|
| 5,187,776 A | 2/1993 | Yanker |
| 5,754,850 A | 5/1998 | Janssen |
| D395,426 S | 6/1998 | Chiba |
| D403,313 S | 12/1998 | Peppel |
| 5,889,517 A | 3/1999 | Ueda et al. |
| D418,120 S | 12/1999 | Okura et al. |
| D418,495 S | 1/2000 | Brockel et al. |
| 6,054,990 A | 4/2000 | Tran |
| D427,574 S | 7/2000 | Sawada et al. |
| 6,101,480 A | 8/2000 | Conmy et al. |

(Continued)

OTHER PUBLICATIONS

Microsoft, Microsoft Computer Dictionary 451 (5th Ed. 2000).*

(Continued)

*Primary Examiner* — Justin R. Blaufeld
(74) *Attorney, Agent, or Firm* — Athorus, PLLC

(57) ABSTRACT

Methods and systems for selecting and displaying items includes causing the display of a large image of a selected item, a plurality of view icons indicative of different views of the selected item, and item details associated with a selected item. After the customer selects a view and/or color for the large image and mouses over the image, a zoom box appears and a corresponding magnified image window appears with a magnified image of the zoom box image for the selected view and color of the item.

19 Claims, 8 Drawing Sheets

(56) References Cited

U.S. PATENT DOCUMENTS

| | | | |
|---|---|---|---|
| 6,268,854 B1 | 7/2001 | Borden et al. | |
| 6,288,702 B1 * | 9/2001 | Tachibana | G06F 3/0481 |
| | | | 345/671 |
| 6,320,602 B1 | 11/2001 | Burkardt et al. | |
| D459,360 S | 6/2002 | Leon et al. | |
| D470,857 S | 2/2003 | Anderson et al. | |
| D474,778 S | 5/2003 | Barnes | |
| 6,678,891 B1 | 1/2004 | Wilcox et al. | |
| 6,728,706 B2 | 4/2004 | Aggarwal et al. | |
| 6,795,810 B2 | 9/2004 | Ruppelt et al. | |
| 6,798,630 B1 | 9/2004 | Vecchio et al. | |
| RE38,609 E | 10/2004 | Chen et al. | |
| D513,511 S | 1/2006 | Decombe | |
| 6,983,420 B1 | 1/2006 | Itou et al. | |
| 7,058,902 B2 | 6/2006 | Iwema et al. | |
| D528,553 S | 9/2006 | Nevill-Manning et al. | |
| D528,556 S | 9/2006 | Decombe | |
| D529,036 S | 9/2006 | Koch et al. | |
| D529,037 S | 9/2006 | Koch et al. | |
| D529,509 S | 10/2006 | Stabb | |
| D529,920 S | 10/2006 | Nevill-Manning et al. | |
| D530,336 S | 10/2006 | Thomsen | |
| 7,149,710 B1 * | 12/2006 | Edmark | G06Q 30/0643 |
| | | | 705/26.8 |
| D534,543 S | 1/2007 | Gusmorino et al. | |
| 7,167,876 B2 | 1/2007 | Cookson et al. | |
| 7,197,718 B1 | 3/2007 | Westerman et al. | |
| D541,291 S | 4/2007 | Zhou et al. | |
| D546,336 S | 7/2007 | Vong et al. | |
| D548,743 S | 8/2007 | Takahashi et al. | |
| D554,652 S | 11/2007 | Shen et al. | |
| D554,654 S | 11/2007 | Waldeck | |
| 7,310,105 B2 | 12/2007 | Yamada | |
| 7,353,461 B2 | 4/2008 | Davidsson et al. | |
| 7,379,053 B2 | 5/2008 | Schaefer | |
| 7,447,425 B2 | 11/2008 | Gong | |
| 7,551,187 B2 * | 6/2009 | Agrawala | G06F 40/169 |
| | | | 345/660 |
| 7,580,867 B2 * | 8/2009 | Nykamp | G06Q 30/0601 |
| | | | 705/27.2 |
| 7,603,367 B1 * | 10/2009 | Kanter | G06F 16/00 |
| | | | 707/999.005 |
| 7,676,759 B2 | 3/2010 | Carter | |
| 7,693,753 B1 * | 4/2010 | Purdy | G06Q 30/0643 |
| | | | 705/27.2 |
| 7,698,647 B2 | 4/2010 | Steeb, I et al. | |
| 7,774,712 B2 * | 8/2010 | Laff | G06F 3/0481 |
| | | | 715/764 |
| 7,882,156 B2 | 2/2011 | Wykes et al. | |
| 7,904,411 B2 | 3/2011 | Bechtel et al. | |
| 8,707,214 B2 | 4/2014 | Horvitz et al. | |
| 8,797,327 B2 | 8/2014 | Finn et al. | |
| 2002/0042755 A1 | 4/2002 | Kumar et al. | |
| 2002/0087558 A1 | 7/2002 | Bailey et al. | |
| 2002/0113816 A1 | 8/2002 | Mitchell et al. | |
| 2002/0138481 A1 | 9/2002 | Aggarwal et al. | |
| 2003/0046700 A1 | 3/2003 | Wilcox et al. | |
| 2003/0050844 A1 | 3/2003 | Ruppelt et al. | |
| 2003/0090474 A1 | 5/2003 | Schaefer | |
| 2003/0160814 A1 | 8/2003 | Brown | |
| 2003/0169302 A1 | 9/2003 | Davidsson et al. | |
| 2004/0083239 A1 | 4/2004 | Cookson et al. | |
| 2004/0117271 A1 * | 6/2004 | Knight | G06Q 30/02 |
| | | | 705/26.5 |
| 2005/0144093 A1 | 6/2005 | Kassan | |
| 2006/0064652 A1 | 3/2006 | Ahokas | |
| 2006/0071942 A1 | 4/2006 | Ubillos et al. | |
| 2006/0150099 A1 * | 7/2006 | Laff | G06F 3/0481 |
| | | | 715/708 |
| 2006/0179027 A1 | 8/2006 | Bechtel et al. | |
| 2006/0184613 A1 | 8/2006 | Stienessen et al. | |
| 2006/0291737 A1 | 12/2006 | Yamada | |
| 2006/0291738 A1 * | 12/2006 | Gong | G06T 3/40 |
| | | | 382/254 |
| 2008/0012863 A1 | 1/2008 | Finn et al. | |
| 2009/0064018 A1 | 3/2009 | Horvitz et al. | |
| 2009/0132943 A1 | 5/2009 | Minsky et al. | |
| 2017/0147174 A1 * | 5/2017 | Olejniczak | H04N 21/4223 |

OTHER PUBLICATIONS

IEEE, The Authoritative Dictionary of IEEE Standard Terms 973 (7th Ed.).*

Merriam-Webster, resolution, https://www.merriam-webster.com/dictionary/resolution>.*

Coates, J., "The Chicago James Coates Computers column," Knight-Ridder Tribune Business News—Chicago Tribune—Illinois, Feb. 20, 2006.

Finnegan, F., "Questions and Answers: Windows," Microsoft Systems Journal, vol. 7, No. 2, p. 103, Mar.-Apr. 1992.

Girishankar, S., "Build the E-commerce Catalog—New Content—Management Tools Bring Together Disparate Data Formats and Item Descriptions," InformationWeek, 74, Nov. 1999.

Onlineshoes, onlineshoes.com, Jan. 2007.

Screenshot from the Office for Harmonization in the Internal Market website, (http://oami.europa.eu/RCDOnline/RequestManager) dated Mar. 25, 2008 (2 pages).

Smith, A., "New Look for Solid Modeling, A," Computer-aided Engineering, vol. 15, No. 4, pp. 19-24, Apr. 1996.

* cited by examiner

METHOD AND SYSTEM FOR DISPLAYING ITEMS

CROSS-REFERENCE TO RELATED APPLICATIONS

This application is a continuation of U.S. patent application Ser. No. 14/791,818, now U.S. Pat. No. 10,515,140, filed Jul. 6, 2015, which is a continuation of U.S. patent application Ser. No. 11/694,726, now U.S. Pat. No. 9,075,492, filed Mar. 30, 2007. The contents of each of these applications are incorporated by reference herein in their entirety.

TECHNICAL FIELD

This disclosure relates generally to methods and systems for displaying items and, more particularly, to a method and system for displaying magnified images of items.

BACKGROUND

It is now commonplace for consumers (or customers or shoppers or buyers) to purchase goods or products from client-server based (on-line or e-commerce or Internet-based) retailers (or merchants). A large number of retailers have set up Internet web sites where consumers can shop for the products (or items or goods) that are available for sale, purchase the products desired, and have the products delivered to them. These products may be tangible goods, such as groceries, books, CDs, DVDs, tools, clothes, footwear, health/beauty items, hardware, or any other tangible goods that are physically delivered to the customer, or "digital" goods, such as electronic books, music, movies/videos, application software, or any other digital product that is downloaded, copied, transmitted or otherwise electronically transferred to the customer.

To find a desired item to purchase, the customer may perform a search using the merchant website search tools. The search results are typically displayed as a list of items that are related to the search request. The customer then selects (or clicks on) a desired item in the list, which causes the website to display the item details, including the item specifications, characteristics, features and/or images of the item. After reviewing the item details, the customer purchases the item, e.g., a pair of shoes, and the item is shipped to the customer. However, when the shoes are received by the customer, it becomes clear that the shoes have a buckle that will dig into the customer's sensitive ankle, an aspect that could have been detected by close visual examination of the item prior to purchase. Thus, the customer must return the item to the merchant and select another pair of shoes to purchase. Such an item purchase and return process can be very inefficient and can lead to buyer frustration that may greatly diminish the shopping experience.

Therefore, the current techniques for purchasing certain products on line do not provide the customer with sufficient visual information to ensure the selected item is properly suited for the customer. Accordingly, it would be desirable to have a system or method for assisting shoppers that overcomes the limitations and inefficiencies of the conventional approaches, that, among other potential benefits, provides a more effective way of allowing the customer to ensure the product is the correct product for the customer, prior to purchase, to avoid unnecessary costs, returns and delays, thereby improving the shopping experience with the merchant.

SUMMARY

Systems and methods for displaying items are disclosed. For example, according to one embodiment of the present disclosure, a method includes causing the display of a large image of a view of a selected item, the view corresponding to a selected one of a plurality of view icons; causing the display of a zoom box over at least a portion of the large image in response to a selection of at least a portion of the large image, the portion of the large image within the zoom box being a zoom box image; causing the display of a magnified image of the zoom box image, the magnified image being larger than the zoom box image; and the magnified image being a predetermined portion of a high resolution image.

For example, when Sue is shopping for shoes, a search results list returns twenty shoes displayed on the merchant web page. When Sue clicks on a shoe image in the list, a zoom detail window (or screen) appears, which shows a large image of the shoe, shows several view icons indicative of several different views of the item, and shows item details about the shoe in an adjacent item details section (e.g., price, availability and available colors, sizes, and widths). When Sue mouses over a right side view icon, the large image changes to show the right side view of the shoe. Then, when Sue mouses over the large image, a zoom box appears over that portion of the image, and a magnified image window appears with a magnified image of the image within the zoom box, allowing Sue to see specific aspects of the desired view of the shoe, such as the buckle and the straps. When Sue moves the mouse along the display in the large image view, the zoom box moves with the mouse, providing magnified details of the shoe where the zoom box is located. After viewing magnified images of several different views of the shoe, Sue decides to purchase the shoes, and this product is shipped to her.

The present disclosure provides a method and system for displaying magnified images of user selectable portions of various different views of items to allow a customer to view the item at the level of detail needed to make a purchase. It allows the customer to easily switch from one view to the next by mousing over view icons and then selectively zooming into each view as desired to magnify areas of interest. Also, the disclosure allows the customer to select an available color for the item and view the item in that color as the large image view and also zoom in on desired portions of the color-selected item without having to changes screens. Further, a portion of the item detail screen section may be used for the "zoom" window or section and automatically switches back to the item detail section when the zoom box is not being used. Still further, the size of the zoom box automatically adjusts to the size of a high resolution image from which the magnified image is displayed.

The foregoing and other objects, features and advantages of the present disclosure will become more apparent in light of the following detailed description of exemplary embodiments thereof.

DETAILED DESCRIPTION

Figure 1:
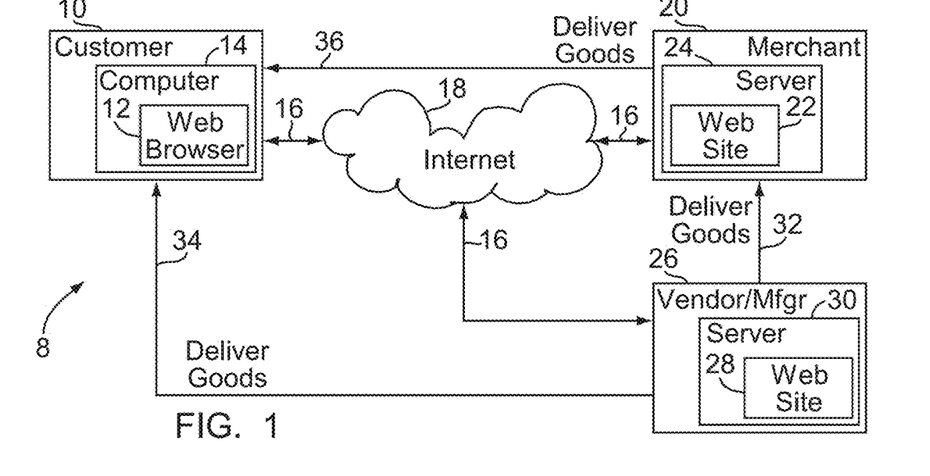
FIG. 1 is a block diagram of the components of a customer-merchant shopping system, in accordance with embodiments of the present disclosure.

FIG. 1 illustrates the principal components of an embodiment of a customer-merchant client-server based ordering system 8, which includes a customer 10 (or consumer or client or shopper or buyer) and an e-commerce or Internet-based merchant (or supplier or retailer or seller or reseller or distributor) 20. The customer 10 can be any entity or individual that wishes to purchase, rent, lease, borrow, or otherwise obtain, goods (or products) or services from the merchant 20. The customer 10 uses a web browser 12 running on a computer 14. The merchant 20 is an entity that sells items from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other web-enabled applications or features including email, or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to make purchases, the customer 10 browses through information concerning goods (or products) or services available for purchase from the merchant 20. After selecting one or more product(s) or service(s) (collectively, "items") that the customer 10 wishes to purchase, an order is sent to the merchant 20. The order is placed via a communication from the web browser 12 to the web site 22 operating on the server 24 of the merchant 20, which includes payment by the customer 10 to the merchant 20 for the items. The merchant 20 then delivers the items to the customer 10 as indicated by the line 36. Alternatively, the vendor 26 may deliver the items directly to the customer 10 as indicated by the line 34.

Figure 2:
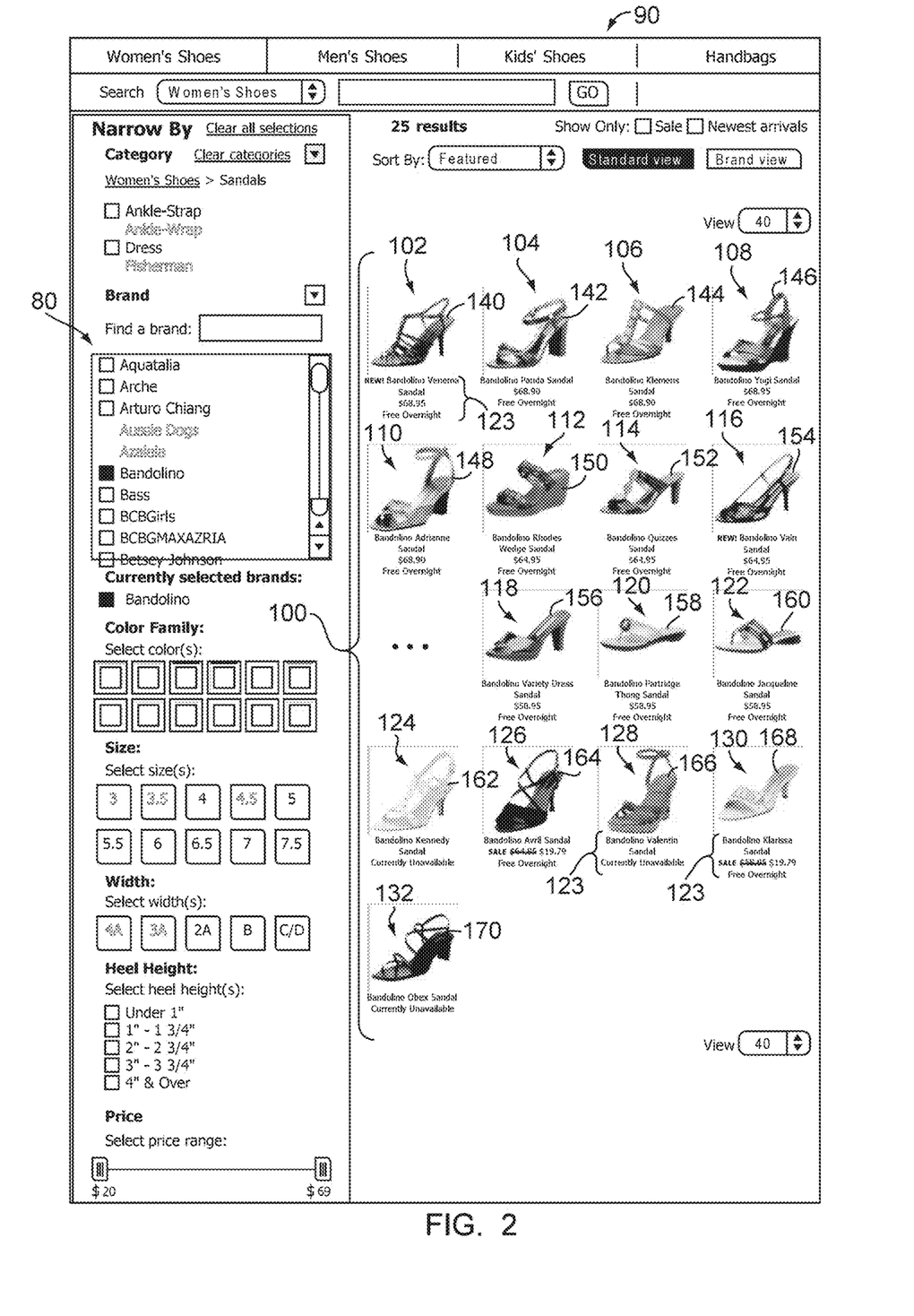
FIG. 2 is a screen illustration of a search results items list, in accordance with embodiments of the present disclosure.

Referring to FIG. 2, a sample merchant website screen 90 (or graphical user interface (GUI) or web page or browser screen) for use by the customer 10 in selecting items for purchase from the merchant 20 via the web site 22, includes a search results list (or group, or set, or collection) 100 of one or more items 102-132. As used herein, the term "list"

includes, but is not limited to any list, group, set, or collection of two or more items. The items list 100 may be displayed on one or more separate screens or web pages. The number of screens and the number of items on each screen depends on the format and content of images displayed in the items list 100. Each of the items 102-132 has corresponding unique images 140-170 associated therewith. In addition, there may be a brief description 123 of each item on the list 100, such as the item name, manufacturer, availability (e.g., in stock, out of stock, discontinued, etc.), price, shipping cost, and the like. The sample screen 90 shows search results for women's shoes, and, in particular, women's sandals having the Bandolino brand, and shows a product filter window or section 80 similar to that described in U.S. patent application Ser. No. 11/694,675, entitled "Method and System for Selecting and Displaying Items," having the same filing date as U.S. patent application Ser. No. 11/694,726, which is incorporated herein by reference in its entirety. However, the scope of the present disclosure is not limited in this regard as the system and method of the present disclosure can be utilized in connection with any items list or any other grouping or list having any types of items, such as a list of items in a shopping cart, on a wish list, or any other type of items list in any format, including text and/or images, or any other format. Further the present disclosure may be used with an individual item not in a list.

Figure 3:
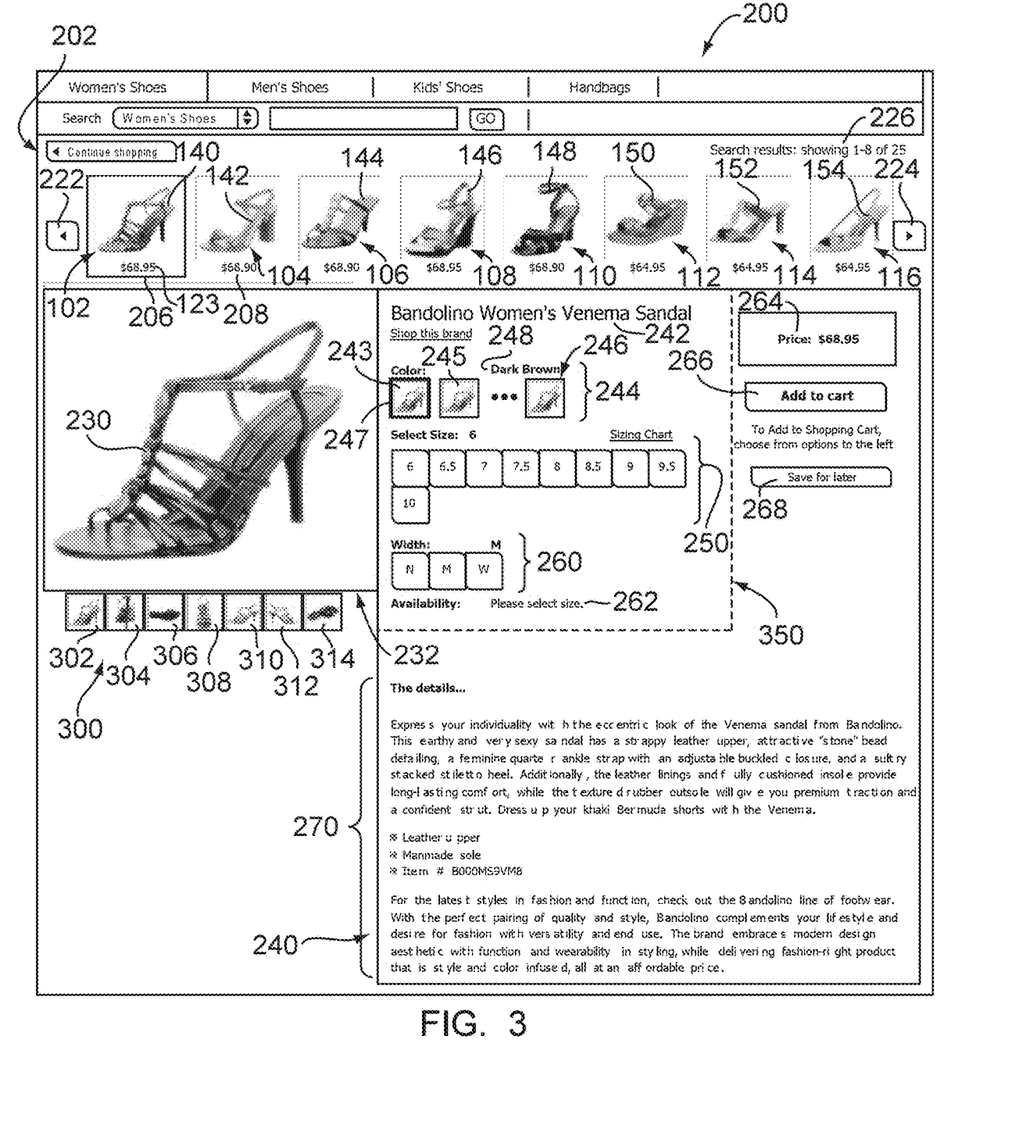
FIG. 3 is a screen illustration of a zoom detail window, in accordance with embodiments of the present disclosure.

Referring to FIG. 3, when the customer 10 selects (or clicks on) one of the items 102-132 in the list 100 (FIG. 2), e.g., the first item 102, a Bandolino Venema Sandal, a zoom detail window or screen 200 appears. The zoom detail screen 200 includes a large image view window or screen section 232, a plurality of small thumbnail image views (or image view icons or view icons) 300, and an item (or product) detail window 240. In addition, an optional slide show viewer (or slider) window or screen section 202 may also be displayed which allows the customer 10 to select other items from the list 100 without having to leave the web page, such as is described in U.S. patent application Ser. No. 11/694,597, entitled "Method and System for Selecting and Displaying Items," which has the same filing date as U.S. patent application Ser. No. 11/694,726, and is incorporated herein by reference in its entirety (discussed more hereinafter).

In the large image view section 232 on the screen 200 is a large image 230 of the selected item 102. Below the large image view section 232 are the view icons 302-314 (collectively, numeral 300), each indicative of a different view of the item 102. For example, the view icon 302 is a right side elevated perspective view, shown as the large image 230 in the large image section 232. Also, the view icon 304 is a back view of the item 102, the view icon 306 is a bottom view of the item 102, the view icon 308 is a front view of the item 102, the view icon 310 is a right side view of the item 102, the view icon 312 is a left side view of the item 102, and the view icon 314 is a top view of the item 102.

When the customer 10 mouses over (or selects) one of the view icons 302-314, the associated image is displayed as a large image in the large image view section 232. Thus, the customer 10 may sequentially view a plurality of different views of the item 102 prior to purchase on the same browser screen using the "mouse-over" feature (thus, no new browser screen is generated for each different view displayed). Although there are seven view icons 302-314 shown in the embodiment of FIG. 3, any number of view icons 300 may be used and the view icons 300 may be displayed in any order. The mouse-over selection of the view icons 300 allows the customer 10 to easily change views by moving the mouse across the icons 300. Instead of or in addition to mousing over the view icons 300 to select the large image view in the section 232, the customer 10 may select a view by clicking on the corresponding icon 300.

Figure 4:
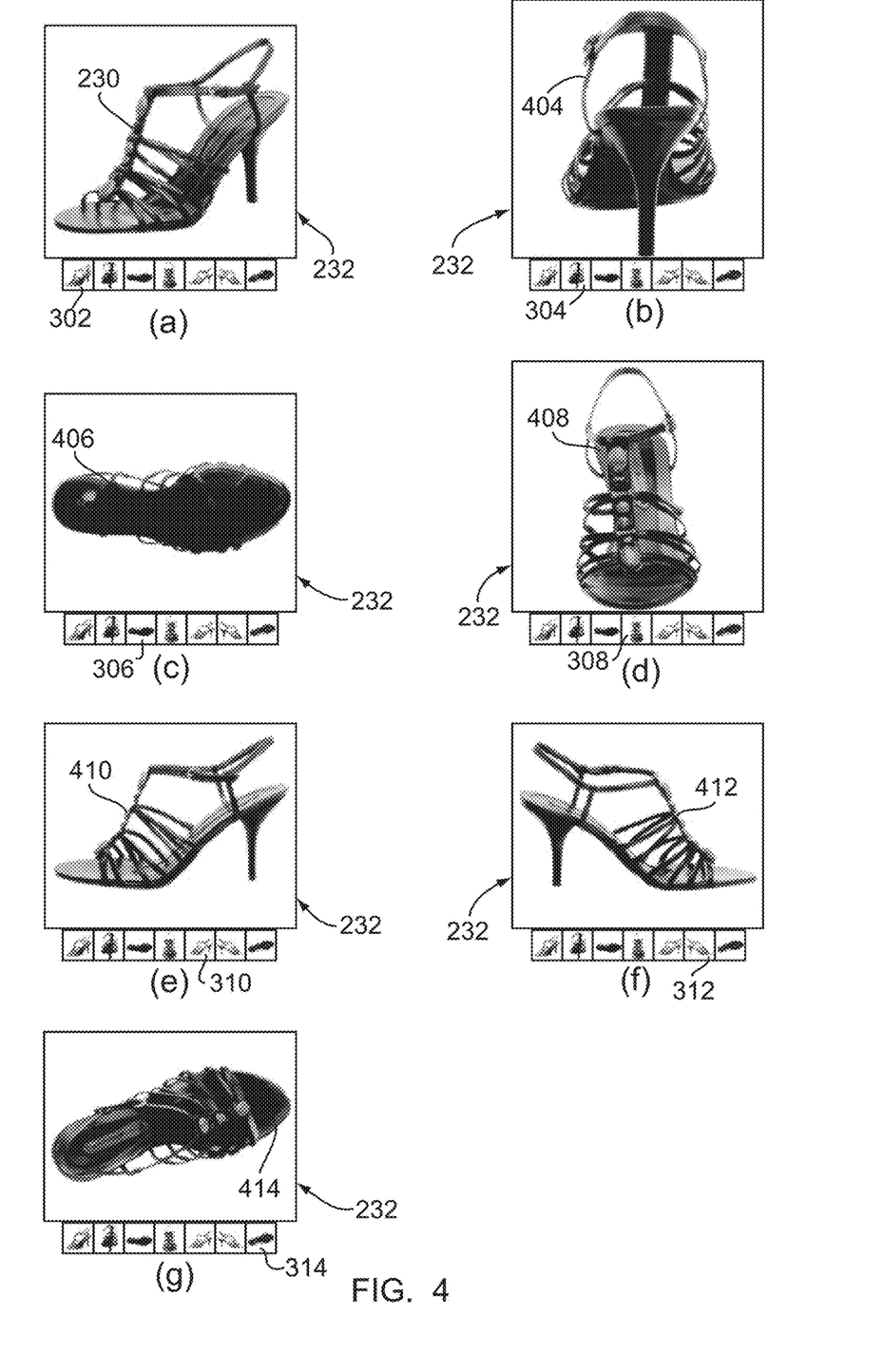
FIG. 4, illustrations (a)-(g), show various different image views of an item, in accordance with embodiments of the present disclosure.

Referring to FIG. 4, illustrations (a)-(g), more specifically, each of the view icons 302-314 are shown having the large images 230,404-414, respectively, as the large image in the large image section 232. In particular, FIG. 4, illustration (a) shows the image 230 as the large image if a right side perspective view of the item 102 corresponding to the view icon 302; illustration (b) shows a large image 404 of a back view of the item 102 corresponding to the view icon 304; illustration (c) shows a large image 406 of a bottom view of the item 102 corresponding to the view icon 306; illustration (d) shows a large image 408 of a front view of the item 102 corresponding to the view icon 308; illustration (e) shows of an image 410 of a right side view of the item 102 corresponding to the view icon 310; illustration (f) shows an image 412 of a left side view of the item 102 corresponding to the view icon 312; and illustration (g) shows an image 414 of a top view of the item 102 corresponding to the view icon 314.

Referring again to FIG. 3, to the right of the large image view screen section 232 is the item (or product) detail window or screen section 240 having a header or title 242 with the name of the selected item 102, in this example, "Bandolino Women's Venema Sandal". The section 240 contains predetermined detail information about the selected item 102. In particular, there may be a color selector 244, a size selector 250, a width selector 260. The color selector 244, the size selector 250 and the width selector 260 may provide an interactive attribute selection and availability feature or tool for displaying available colors, sizes and widths, for the selected item 102, as is described in detail in U.S. patent application Ser. No. 11/694,597, entitled "Method and System for Selecting and Displaying Items," which has the same filing date as U.S. patent application Ser. No. 11/694,726, and is incorporated herein by reference in its entirety. When the customer 10 selects an attribute in one of the selectors 244,250,260, the other selectors are all automatically updated to indicate the availability of their respective attributes based on the selected attribute, as is discussed in the aforementioned patent application. Further, selectors 244,250,260 and the availability indicator 262 may be located within a zoom window or screen section 250 (discussed more hereinafter) within the items details section 240. Also, the item details section 240 may have an availability field 262 indicative of the availability of the selected item 102 based on attributes selected in the selectors 244, 250,260.

In addition, the section 240 may have a price field 264, displaying the current price or sale price of the item; an "add to cart" button 266, that allows the customer 10 to add the item 102 to the shopping cart; and/or a "save for later" button 268 that allows the customer 10 to save the information on the current screen for later use. Also, the section 240 may have a section 270 labeled "The details.", which provides a narrative description of the item and some item features, attributes, characteristics, and suggestions of the selected item 102 that may be of interest to the customer 10. Other item details, attributes, features, characteristics, marketing information, and/or specifications may be included in the item details screen 240.

When the selected item 102 can be purchased in different colors, the item detail window 240 may provide an interactive item color viewing feature that allows the customer 10 to view a large view of the selected item in the selected color. In particular, if the shoe 102 is available in a plurality of colors, the color selector 244, may have color item thumbnail images (or color icons or color selectors) 246, one for each of the available colors for the item 102. When the customer 10 selects (mouses over or clicks on) one of the color icons 246, a color description 248 appears, e.g., dark brown, black, yellow, dark red leather, black fabric, etc., describing the color and/or the material or "feel" of the item.

For example, if the customer 10 mouses over the color icon 243, e.g., indicative of the color dark brown, the color field 248 shows "dark brown" as the color, and the image 230 in the large image view section 232 becomes an image of the item 102 in the color dark brown. When the customer 10 mouses over the next color icon 245, indicative of the color black, the color field 248 shows "black" as the color, and the image 230 in the large image view section 232 becomes an image of the item 102 in the color black. A similar process is performed for any of the color icons 246 in the color selector 244.

Also, if the customer 10 clicks on one of the color icons 244, e.g., the icon 243, a dark box 247 appears around the corresponding color icon 244, the large image 230 "locks" (or becomes fixed) with that color image when the mouse is moved away from the color icons, and the view icons 300 update to provide view icons 300 for the selected color. The customer 10 can then mouse over the icons 300 and view various different views of the large image 230 in the section 232 of the selected item 102 in the selected color. Thus, the customer 10 can easily view various views of large images of the shoe in a selected color in the section 232 to assist in purchasing the proper color shoe. This color viewing feature may apply to any item sold by the merchant and desired to be used by the customer.

It should be understood that for any of the embodiments herein, when an image (or icon) in the zoom detail screen 200 is selected, e.g., the view icons 300, the item detail screen 204 icons, or anywhere else in the zoom detail screen 200, the screen may be updated to display the associated image with a box, an outline, a color, shading, shadow, or some type of highlighting, mark, or indicia, so that the selected status thereof is distinguishable from the icons that have not been selected. Also, the view icons 300 and the color icons 246 may be small thumbnail images of the selected item or may be other graphical or text icons, buttons, or selectors indicative of the function to be performed.

The interactive interface for the color, size and width attributes described hereinbefore is similar to that described in U.S. patent application Ser. No. 11/617,998, filed Dec. 29, 2006, entitled "Methods and Systems for Selecting Item Variations for Display In User Interfaces," which is incorporated herein by reference in its entirety.

Figure 5:
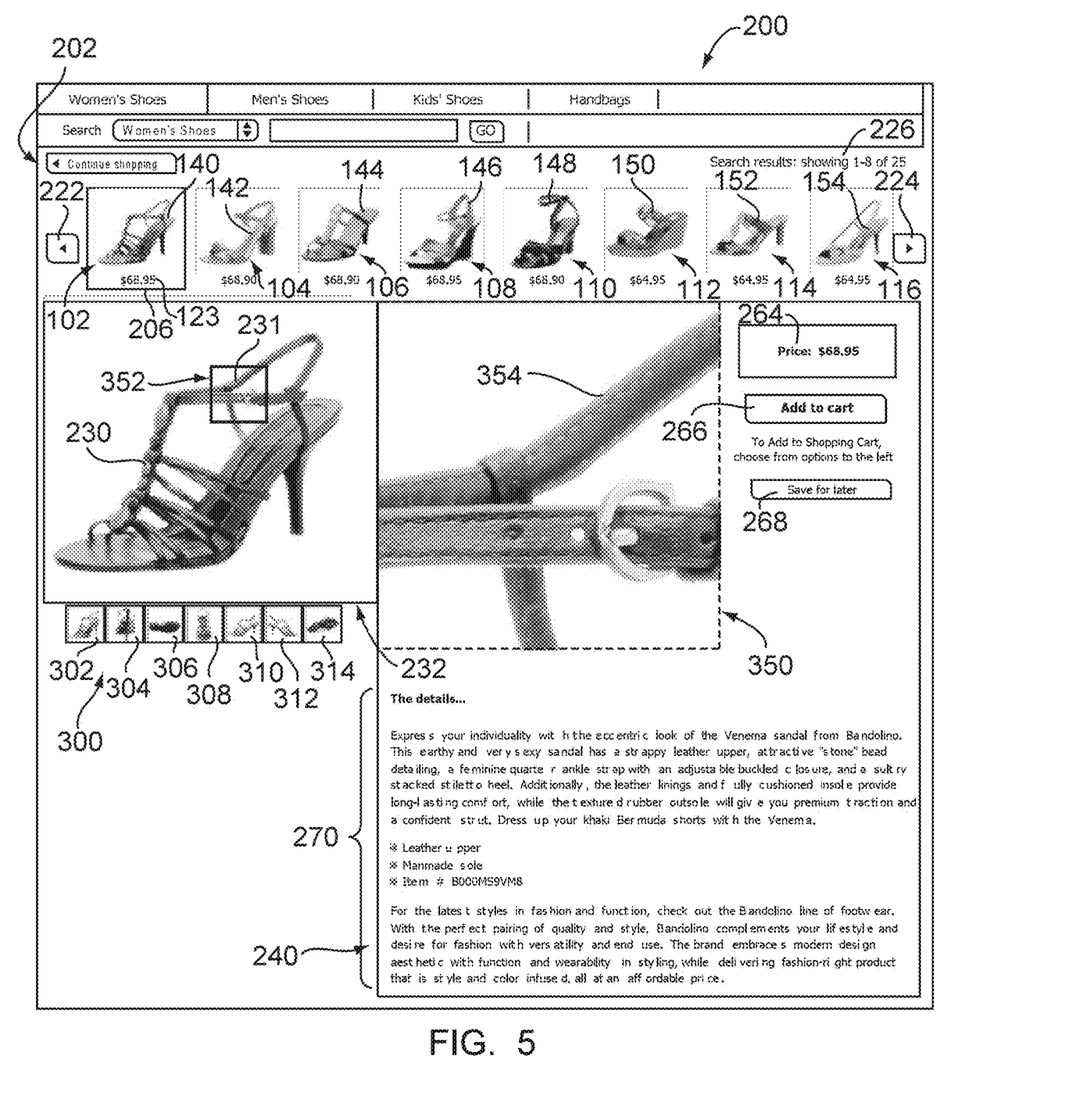
FIG. 5 is a screen illustration of another zoom detail window showing a magnified image section, in accordance with embodiments of the present disclosure.

Referring to FIG. 5, if the customer 10 moves the mouse cursor over (or mouses over) the large image 230 in the large image view section 232, a zoom box 352 appears over a portion of the image 230 around where the mouse cursor is located. At the same time, the magnified image screen or window 350 in the item details section 240, displays a magnified (or enlarged) image 354 of the image within the zoom box 352. In the example of FIG. 5, the zoom box 352 is over the buckle and a portion of the upper strap of the shoe image 230. The magnification (or enlargement) from the image 231 in the zoom box 352 to the magnified image 354 in the magnified image screen or window 350 is determined as discussed hereinafter with FIG. 9. However, any magnification can be used that displays the magnified image 352 in the magnified image screen 350 larger than the image 231 in the zoom box 352.

Figure 9:
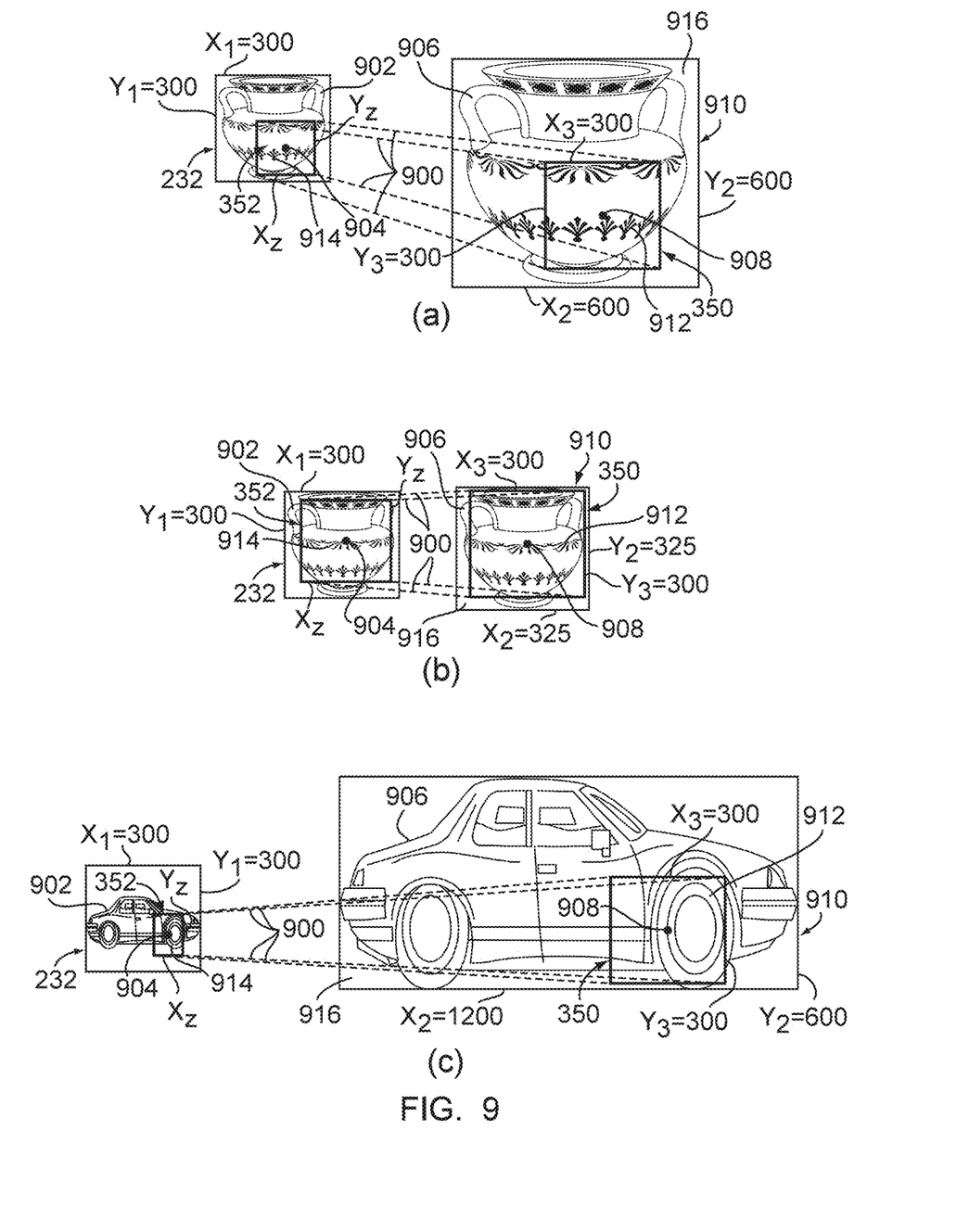
FIG. 9, illustrations (a)-(c), shows various different high resolution image sizes and corresponding zoom box sizes, in accordance with embodiments of the present disclosure.

Referring to FIG. 9, illustrations (a)-(c), the magnified image 354 (FIG. 5) within the magnified image window (or zoom image screen) 350 may be formed by displaying a portion 912 (FIG. 9) of a second high resolution image 906 in the large image view window 232. In particular, referring to FIG. 9, illustration (a), the image view window 232 may have a low resolution image 902. The dimensions of the view window 352 are X1 by Y1, e.g., 300 pixels by 300 pixels. Also, there is a high resolution image 906 that has an image frame 910 having dimensions X2 by Y2, e.g., 600 pixels by 600 pixels. In such a case, when the customer 10 mouses over the image 902 in the window 232, a mouse cursor location is used as a reference point for the center 904 of the zoom box 352. For example, in some embodiments, the mouse cursor location defines the center point 904 of the zoom box 352; however, the mouse cursor location may define any other reference point for the zoom box and, thus, may be located at a corner of the zoom box 352 or even outside of the zoom box 352, among many other possibilities. The location of the center point 904 of the zoom box 352 is mapped onto a corresponding point 908 on the high resolution image 906. This mapping may be done by knowing the x,y location of the mouse cursor with respect to the center point 904 within the window 232, the size of the window 232, e.g., 300x300 pixels, and the size of the high resolution image frame 910, e.g, 600x600 pixels. The corresponding location 908 of the center point 904 in the high resolution image 906 can then be determined, e.g., by calculating the percentage along the x and y dimensions that the center point 904 is located within the view window 232 and applying these percentages to the corresponding x,y dimensions of the frame 910 to locate the corresponding point 908 within the frame 910 for the image 906. Other techniques may be used to determine the location of the point 908. The points 904,908 may be called "anchor points" or "reference points" as they are the points from which the boxes 352,350 are derived.

Once the location of the anchor point 908 on the high resolution image is determined, a portion 912 of the image 906 for the magnified image window 350 is identified based on the dimensions X3,Y3 of the window 350, e.g., 300x300 pixels. Thus, in that case, the window 350 would be the portion 912 of the image 906 that is defined by a box which is 150 pixels up, down, left, and right of the anchor point 908 for the image data. The aspect ratio of the dimensions of the high resolution image frame 910 to the dimensions of the magnified image window 350, when applied to the dimensions of the image view window 232, determines the dimensions Xz,Yz of the zoom box 352. For example, in that case, the horizontal (X) aspect ratio may be calculated as X3/X2=300/600=0.5, and the vertical (Y) aspect ratio may be calculated as Y3/Y2=300/600=0.5. Applying this aspect ratio to the dimensions X1,Y1 of the image view window 232, provides the zoom box 352 dimensions Xz,Yz of: Xz=X1*0.5=300*0.5=150 pixels; and Yz=Y1*0.5=300*0.5=150 pixels, centered around the point 904. Thus, the zoom box 352 dimensions Xz,Yz are such that the portion 914 of the image 902 within the zoom box 352 is indicative of the portion 912 of the high resolution image 906 in the magnified image window 350.

Referring to FIG. 9, illustration (b), if the dimensions of the high resolution image frame 910 are only slightly larger than the magnified image window 350, e.g., X2=325, Y2=325 and X1=300, Y1=300 pixels, the size of the zoom box 352 is calculated to be a relatively large portion of the image view window 232. For example, in such a case, the horizontal (X) aspect ratio is X3/X2=300/325=0.923 and the vertical (Y) aspect ratio is Y3/Y2=300/325=0.923. Applying this aspect ratio to the dimensions X1,Y1 of the image view window 232 provides the zoom box 352 dimensions Xz,Yz of: Xz=X1*0.923=300*0.923=277 pixels (rounded to the nearest pixel); and Yz=Y1*0.923=300*0.923=277 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. Thus, because the aspect ratios are close to 1, the zoom box is a large portion of the view window 232.

Referring to FIG. 9, illustration (c), if the horizontal and vertical dimensions X2,Y2 of the high resolution image frame 910 are not the same value, e.g., X2=1200, Y2=600 pixels (a rectangle instead of a square), the dimensions Xz,Yz of the zoom box 352 will adjust accordingly. For example, in such a case, the horizontal (X) aspect ratio is X3/X2=300/1200=0.25 and the vertical (Y) aspect ratio is Y3/Y2=300/600=0.5. Applying this aspect ratio to the dimensions X1,Y1 of the image view window 232, provides the zoom box 352 dimensions Xz,Yz of: Xz=X1*0.25=300*0.25=75 pixels (rounded to the nearest pixel); and Yz=Y1*0.5=300*0.5=150 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. In this example, the high resolution image 906 is a rectangular shape because the image 906 that shape maximized the amount of the image in the frame 910. Thus, the zoom box in this example, is a corresponding rectangular shape based on the aspect ratios.

Therefore, the dimensions Xz,Yz of the zoom box 352 may be determined using the following equations:

$$Xz=X1(X3/X2) \quad \text{Eq. 1}$$

$$Yz=Y1(Y3/Y2) \quad \text{Eq. 2}$$

where X1, Y1 are the dimensions of the large image window 232, X2,Y2 are the dimensions of the high resolution image frame 910 (or the outer dimensions of the high resolution image 906), and X3,Y3 are the dimensions of the magnified image window 350. Other equations may be used provided the zoom box size is set based on the aspect ratio of the high resolution image 906 to the magnified image window 350.

It should be understood that the high resolution image may be a cropped image, e.g., the frame 910 around the high resolution image 906 may be as close as possible to the outer edges of the image 906 in both the X and Y dimensions to minimize the amount of blank space 916 in the high resolution image 906. This minimizes the magnification of unnecessary aspects of the image and maximizes the image resolution for a given set of pixel dimensions. In addition, this zoom technique automatically adjusts for different aspect ratios between the high resolution image frame 910 and the magnified image window 350. Further, the anchor points 904,908 from which the boxes 352,350 are derived, respectively, need not be in the center of the boxes 352,350, but may be any located anywhere in the window frames 232,910, provided the boxes 352,350 can be formed on their respective images 902,906 therefrom. Also, it should be understood that the dimensions of the magnified image window 350 and the zoom box 352 may be any values and the shape need not be square, and the technique discussed herein will adjust accordingly to the shape and size of same.

Figure 6:
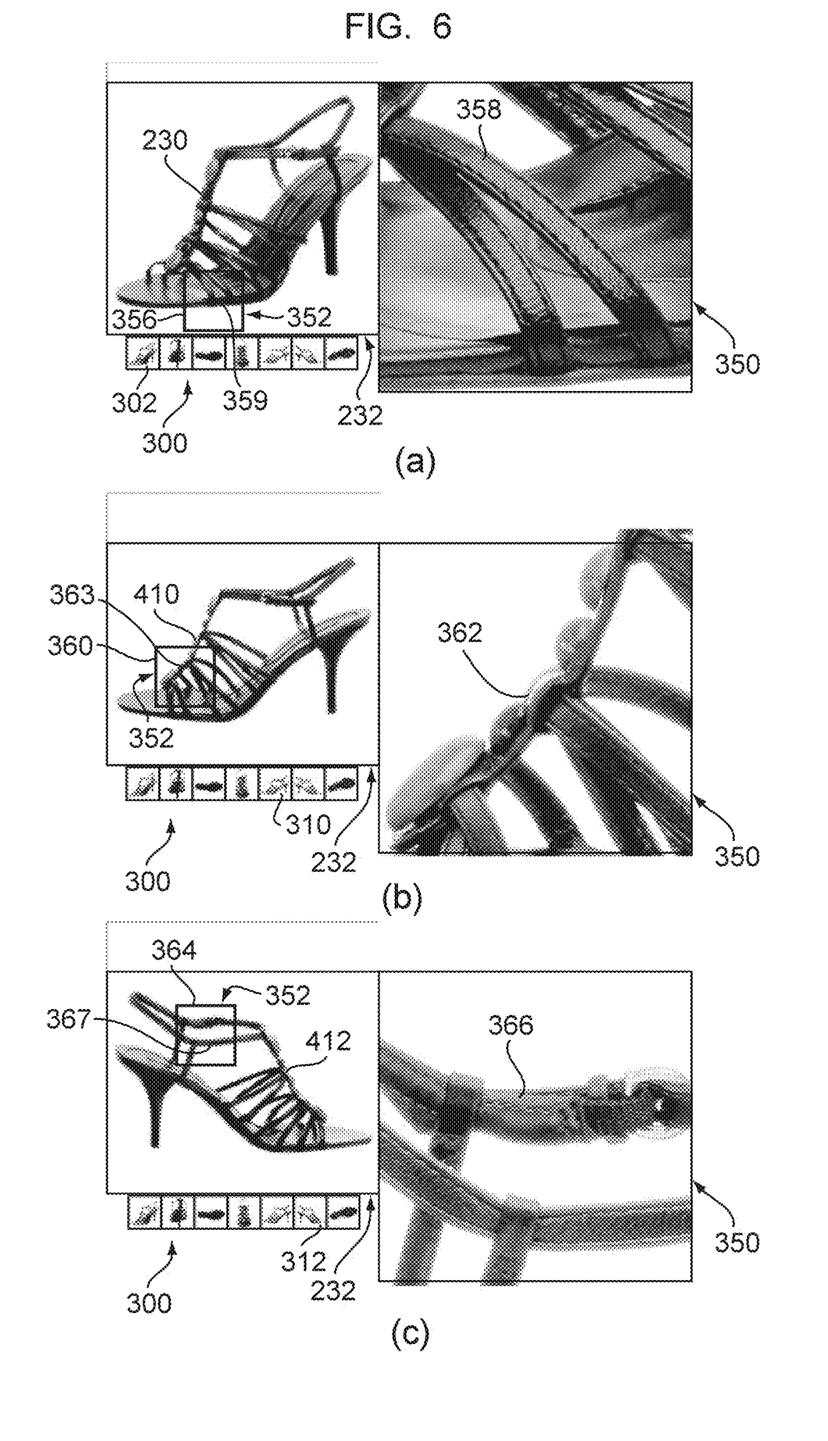
FIG. 6, illustrations (a)-(c), show various different image views of an item with selected magnified image section, in accordance with embodiments of the present disclosure.

Referring to FIG. 6, illustration (a), when the customer 10 moves the mouse to a new position 356 on the image 230, the zoom box 352 moves to that location, and a new magnified image 358 of a new portion 359 of the image 230 in the zoom box 352 is displayed in the magnified image window 350. Referring to FIG. 6, illustration (b), when the customer 10 mouses over the view icon 310 (right side view), an image 410 appears in the large view section 232 without further selection of the view icon 310 by the customer 10 (e.g., no mouse click is required). When the customer 10 moves the mouse cursor from the view icon 310 to a position 360 on the image 410, the zoom box 352 appears and moves to that position, and a magnified image 362 of a portion 363 of the image 410 within the zoom box 352 is displayed in the magnified image window 350. Referring to FIG. 6, illustration (c), when the customer 10 next mouses over the view icon 312 (left side view), an image 412 appears in the large view section 232 without further selection of the view icon 312 by the customer 10. When the customer 10 moves the mouse cursor from view icon 312 to a position 364 on the image 412, the zoom box 352 appears and is moved to that location, and a magnified image 366 of a portion 367 of the image 412 within the zoom box 352 is displayed in the magnified image window 350. Similarly, according to some embodiments, as the customer 10 moves the mouse cursor across the view icons 302-314, the corresponding image 412 dynamically updates to show the view represented by the respective icon 302-314 that the mouse cursor is over at that time.

Also, the zoom box 352 and magnified image screen 350 also work with the color view feature discussed hereinbefore with FIG. 3. As discussed hereinbefore, when a color has been selected (clicked on), the large image 230 in the large image view section 232 is updated (and locked) to show the item in the selected color, and the view icons 300 update to show the image views in the selected color. The customer 10 can then mouse over the color-selected image and the zoom box 352 will appear, the magnified image section 350 will appear, and the customer 10 can view zoomed details of the color-selected image for the selected view in the selected color.

Furthermore, for any of the embodiments described herein whenever the screen is updated in response to a customer 10 action or selection/deselection, it may be updated such that a new window (or screen section) is displayed within a currently displayed HTML (Hyper Text Markup Language) page, web page, or browser screen (and, thus, no new HTML page, web page, or browser screen is generated). This is to be distinguished from other conventional techniques, where new HTML pages open up over an existing page when a feature, attribute, or icon is selected by the user.

Referring again to FIG. 3, as discussed hereinbefore, the slide show viewer (or slider) 202 may be used in the display screen 200 to allow the customer 10 to select items from the list 100 without having to leave the web page, as is described in detail in U.S. patent application Ser. No. 11/694,597, entitled "Method and System for Selecting and Displaying Items," which has the same filing date as U.S. patent application Ser. No. 11/694,726, and is incorporated herein by reference in its entirety.

In particular, the slider section 202 displays a series of eight adjacent thumbnail item images 140-154 in eight corresponding adjacent locations indicative of the first eight items 102-116 in the list 100 (FIG. 3), respectively. However, the slider 202 may display any number of images desired. Also, the slider may display images corresponding to any of the items on the list 100. In addition, there may be certain of the item details information 123 displayed with each of the item images 140-154. Further, the selected item 102 has a box 204 around it in the slider 202 to indicate it is selected.

If there are more than the predetermined maximum number of images, e.g., eight, in the slider 202 (e.g., there are more than eight recommended items in the list 100), left and right scroll arrow buttons 222,224, respectively, appear. The maximum number of images in the slider 202 may be any desired number, depending in part on the size of the images 140-154 and the size of the browser screen. When the customer 10 selects (clicks on or mouses over) the left scroll arrow button 222, the images 140-154 (and the associated item details 123) all scroll (or index or shift) to adjacent positions to the right. Similarly, if the customer 10 clicks on the right scroll button 224, the images 140-154 (together with the associated item summaries 123) all scroll (or index or move) to the adjacent positions to the left.

The scroll type for the slider 202 may be an index-type scroll, where there are preset positions for each image in the slider 202, or a smooth or continuous-type scroll, where there are no fixed positions for the images 140-154 in the slider 202, and the images 140-154 scroll smoothly as a group across the slider screen 202 in the desired direction based on the selection of the scroll buttons 222,224. Also, if there are more than the predetermined maximum number of images in the slider 202, a "search results" summary status 226 of which items are displayed in the slider 202 is provided.

Figure 7:
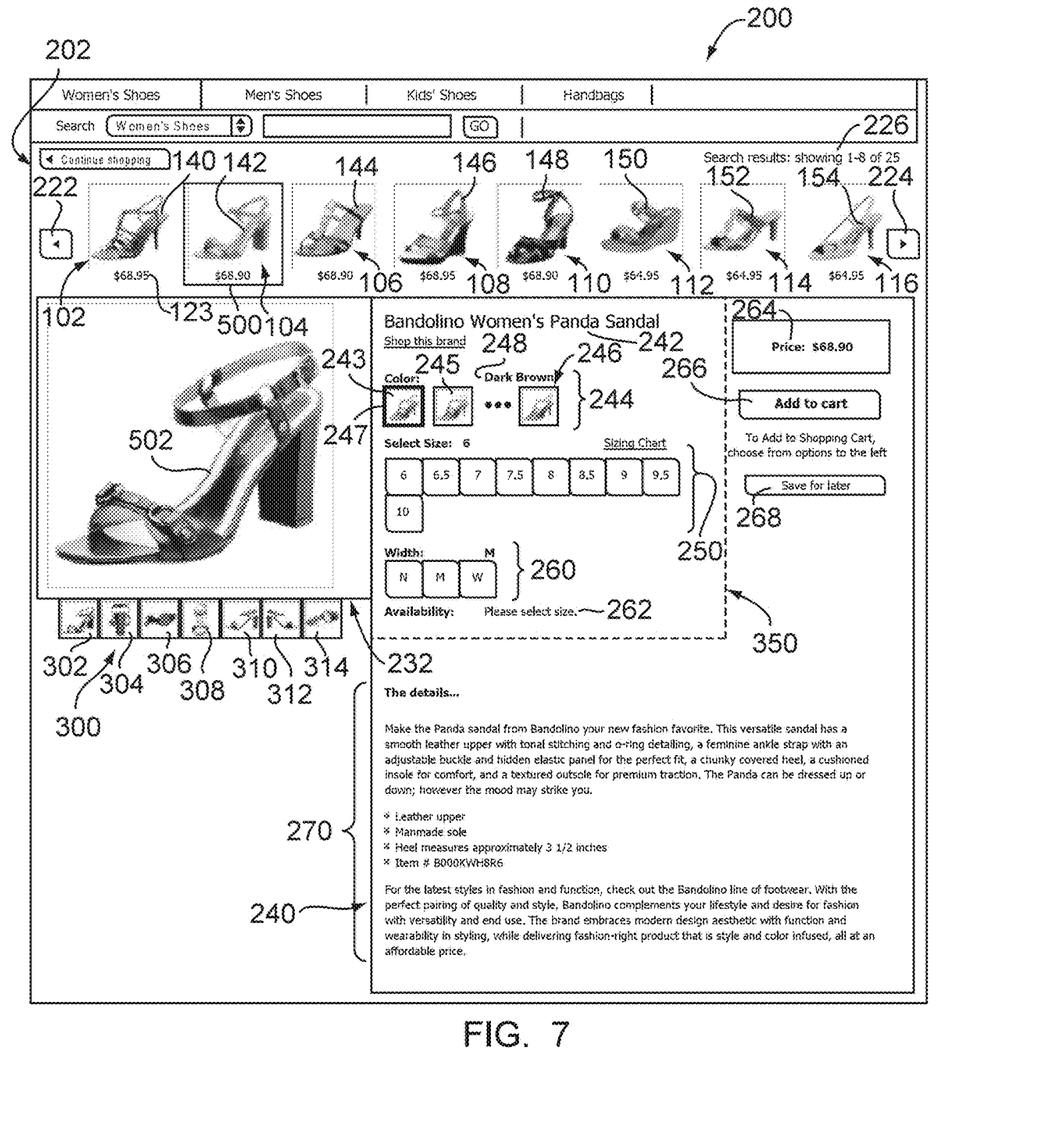
FIG. 7 is a screen illustration of another zoom detail window showing selection of another item, in accordance with embodiments of the present disclosure.

Referring to FIG. 7, when the customer desires to view another item 104 on the list 100, the customer 10 may go back to the screen 90 (FIG. 2) and select the item 104 from the list 100 which will bring the customer 10 to the screen 200. However, if the slider 202 is used, the customer 10 can click on a corresponding image 122 in the slider 202, causing the box 206 (FIG. 3) around the item 102 to disappear and a new box 500 to appear around the selected image 142. In either case, the large image view section 232 is updated to display a large image 502 of the newly selected item 104, and the view icons 300 are updated to show available views for the newly selected item 104. In addition, the item detail section 240 is updated to display details of the item 104. With the item 104 selected, the customer 10 may zoom in on the large image 502 or a large view corresponding to any of the icon views 300 for that item 104 as discussed hereinbefore with FIG. 5 for the item 102.

Figure 8:
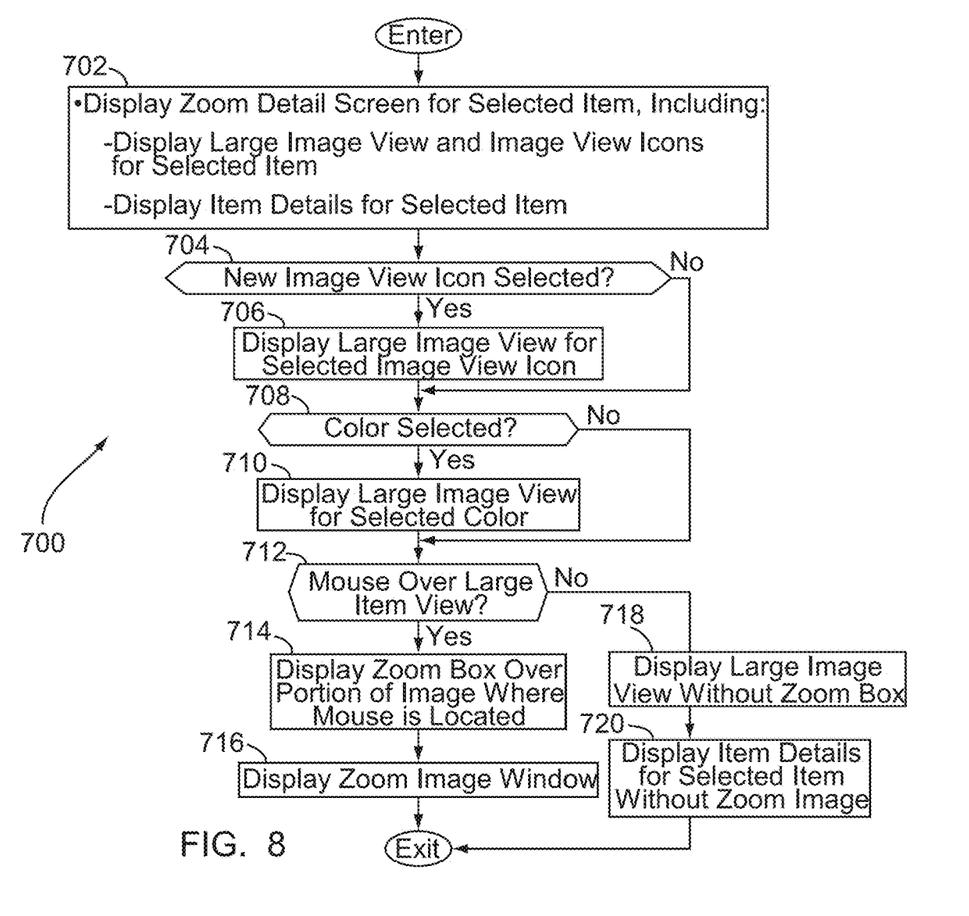
FIG. 8 is a flow chart of a zoom detail window display process, in accordance with embodiments of the present disclosure.

Referring to FIG. 8, a process 700 for providing the zoom detail window user interface disclosed herein begins at block 702, which displays the sections of the zoom detail window 200 for the selected item, including displaying the large image view section 232, displaying the view icons 300, and displaying the item details 240 for the selected item. Next, block 704 determines whether a new one of the view icon 300 has been selected. If YES, block 706 displays a large image for the selected image icon 300 in the large image view section 232. After the block 706 or if the result of the block 704 is NO, a step 708 determines if the customer 10 has selected one of the color icons 246 in the item details section 240. If YES, block 710 displays a large 230 image of the selected item in the large image view section 232 having the selected color. After the block 710 or if the result of block 708 is NO, block 712 determines if the customer 10 has moused over the large item view section 232. If YES, block 714 displays the zoom box 252 (FIG. 3) and a block 716 displays the magnified image 254 in the zoom screen section 350 and then the process exits. If the result of the block 712 is NO, block 718 displays the large image view without the zoom box and block 720 displays the portion of the full item details section without the magnified image window 350.

It should be understood that the screen 200 may be reached by selecting on any item or image on the merchant web site that would bring the customer 10 to an item (or product) details page. Thus, the item need not be selected from a list (or group, or set, or collection), but may be a stand alone item on the merchant web site.

It should be understood that it is not important for the present disclosure how the customer 10 actually purchases or otherwise obtain the desired item. For example, the desired item may be obtained by the customer 10 using the computer 14 and the network 18 or off-line without the use of the computer 14 or network 18, e.g., via telephone, fax, mail, in person, CD, or DVD, or the like.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-executed method comprising:
  receiving a request for information regarding an item from a computer device over a network by at least one server; and generating, by the at least one server in response to the request for information, a set of program code for displaying a web page on a computer display, wherein the set of program code comprises:
 program code for causing a display of a first image of an item on a user interface on the computer display, wherein the first image has a first level of resolution;
 program code for causing a display of an item detail section adjacent the first image on the user interface, wherein the item detail section comprises a plurality of details regarding the item, and wherein the details comprise a name of the item, a price of the item, or a textual description of the item;
 program code for determining that a cursor is over at least a portion of the first image;
 program code for causing a display of a second image of the item over the item detail section on the user interface in response to determining that the cursor is over the portion of the first image, wherein the second image is a portion of a third image, wherein the third image has a second level of resolution, wherein the second level of resolution is greater than the first level of resolution, wherein a height of the third image is greater than a height of the first image, wherein a width of the third image is greater than a width of the first image, and wherein the entire third image is not shown on the computer display; and
 program code for causing a display of a box over the first image while the second image is shown on the computer display,
 wherein a ratio of a height of the box to the height of the first image is substantially equal to a ratio of a height of the second image to the height of the third image, and
 wherein a ratio of a width of the box to the width of the first image is substantially equal to a ratio of a width of the second image to the width of the third image. and
 transmitting, by the at least one server, the set of program code to the computer device over the network.

2. The computer-executed method of claim 1, wherein the set of program code further comprises:
 program code for determining that the cursor is not over any portion of the first image; and
 program code for removing the box over the first image in response to determining that the cursor is not over any portion of the first image.

3. The computer-executed method of claim 1, wherein a ratio of the height of the box to the width of the box is substantially equal to a ratio of the height of the second image to the width of the second image.

4. A first computer system comprising at least one computer processor and at least one data store,
 wherein the first computer system is configured to execute a method comprising:
 receiving a request for information regarding a first item from a second computer system over one or more networks;
 in response to receiving the request for information,
  generating a first set of instructions for displaying a first web page on a computer display, wherein the first set of instructions comprises:
   instructions for causing a display of a first image having a first level of resolution on a user interface on the computer display, wherein the first image depicts the first item;
   instructions for causing a display of an item detail section comprising a plurality of details regarding the first item, wherein at least one of the plurality of details is a name of the first item, a price of the first item, or a textual description of the first item adjacent the first image on the user interface;
   instructions for determining that a cursor is over at least a portion of the first image;
   instructions for causing a display of a second image over at least a portion of the item detail section on the user interface in response to determining that the cursor is over the portion of the first image, wherein the second image is a portion of a third image having a second level of resolution, wherein the second level of resolution is greater than the first level of resolution, wherein the third image depicts the first item, wherein a height of the third image is greater than a height of the first image, wherein a width of the third image is greater than a width of the first image, wherein a height of the second image is less than the height of the third image, and wherein a width of the second image is less than the width of the third image, and
   instructions for causing a display of a box over the first image while the second image is shown on the computer display in response to determining that the cursor is over the portion of the first image, wherein a ratio of a height of the box to the height of the first image is substantially equal to a ratio of the height of the second image to the height of the third image, and wherein a ratio of a width of the box to the width of the first image is substantially equal to a ratio of the width of the second image to the width of the third image; and
 transmitting at least the first set of instructions to the second computer system over the one or more networks.

5. The first computer system of claim 4, wherein the first set of instructions further comprises:
 instructions for determining that the cursor is not over any portion of the first image; and
 instructions for removing the box over the first image in response to determining that the cursor is not over any portion of the first image.

6. The first computer system of claim 4, wherein a ratio of the height of the box to the width of the box is substantially equal to a ratio of the height of the second image to the width of the second image.

7. The first computer system of claim 4, wherein a second number of pixels in the second image is greater than a first number of pixels in the first image.

8. The first computer system of claim 4, wherein the first set of instructions further comprises:
 instructions for causing a display of information regarding a second item, wherein the information regarding the second item is displayed above at least a portion of the first image and at least a portion of the item detail section on the user interface, and wherein the method further comprises:
 receiving a selection of at least a portion of the information regarding the second item from the second computer system;
 in response to receiving the selection of at least the portion of the information regarding the second item, generating a second set of instructions for displaying a second web page on a computer display, wherein the second set of instructions comprises:
  instructions for causing a display of a fourth image having the first level of resolution on the user interface, wherein the fourth image depicts the second item;
  instructions for causing a display of an item detail section comprising a plurality of details regarding the second item, wherein at least one of the plurality of details is a name of the second item, a price of the second item, or a textual description of the second item adjacent the fourth image on the user interface;
  instructions for determining that a cursor is over at least a portion of the fourth image;
  instructions for causing a display of a fifth image of the second item over at least a portion of the item detail section on the user interface in response to determining that the cursor is over the portion of the fourth image,
    wherein the fifth image is a portion of a sixth image having a third level of resolution,
    wherein the third level of resolution is greater than the first level of resolution,
    wherein the sixth image depicts the second item,
    wherein a height of the sixth image is greater than a height of the fourth image,
    wherein a width of the sixth image is greater than a width of the fourth image,
    wherein a height of the fifth image is less than the height of the sixth image, and
    wherein a width of the fifth image is less than the width of the sixth image, and
  instructions for causing a display of a box over the fourth image while the fifth image is shown on the computer display in response to determining that the cursor is over the portion of the fifth image,
    wherein a ratio of a height of the box to the height of the fourth image is substantially equal to a ratio of the height of the fifth image to the height of the sixth image, and
    wherein a ratio of a width of the box to the width of the fifth image is substantially equal to a ratio of the width of the fifth image to the width of the sixth image; and
transmitting at least the second set of instructions to the second computer system over the one or more networks.

9. The first computer system of claim 4, wherein the method further comprises:
  transmitting a second set of instructions for displaying a second web page on a computer display to the second computer system over the one or more networks, wherein the second set of instructions comprises:
    instructions for causing a display of an item collection section comprising a set of items presented in a spaced relationship on the user interface, wherein the item collection section includes an item image, item name, and item price for individual ones of the items of the set, and wherein the first item is one of the items of the set; and
    instructions for causing a display of a product selection tool section adjacent the item collection section, wherein the product selection tool section comprises a set of selectable features associated with at least one of the items of the set of items,
      wherein individual ones of the selectable features are associated with item characteristics, and
      wherein, in response to a selection of one of the selectable features, the set of items presented in the item collection section is narrowed to include items having the item characteristic associated with the one of the selectable features,
  wherein the request for information regarding the first item is a selection of the first item in the item collection section, and
  wherein the second set of instructions is transmitted to the second computer system prior to the first set of instructions.

10. The first computer system of claim 4, wherein the first set of instructions further comprises:
  instructions for causing a display of information regarding at least one category of items on the user interface, wherein the information regarding the at least one category of items is displayed above at least a portion of the first image or at least a portion of the item detail section, wherein the method further comprises:
  receiving a selection of the information regarding the at least one category of items on the user interface;
  in response to receiving the selection of the information regarding the at least one category of items,
    transmitting a second set of instructions for displaying a second web page on a computer display to the second computer system over the one or more networks, wherein the second set of instructions comprises:
      instructions for causing a display of an item collection section comprising a set of items in the at least one category of items presented in a spaced relationship on the user interface, wherein the item collection section includes an item image, item name, and item price for individual ones of the items of the set; and
      instructions for causing a display of a product selection tool section adjacent the item collection section, wherein the product selection tool section comprises a set of selectable features associated with at least one of the items of the set of items,
        wherein individual ones of the selectable features are associated with item characteristics, and
        wherein, in response to a selection of one of the selectable features, the set of items presented in the item collection section is narrowed to include items having the item characteristic associated with the one of the selectable features.

11. The first computer system of claim 10, wherein the product selection tool is aligned along a left side of the item collection section on the first web page, and
  wherein the set of selectable features comprises one or more of:
    a category menu;
    a brand menu;
    a color family table;
    a size table;
    a width table;
    a height table;
    a price range selector;
    a material selector; or
    a style selector.

12. The first computer system of claim 4, wherein the item detail section is provided along a right edge of the first image.

13. The first computer system of claim 4, wherein the first set of instructions further comprises:

instructions for causing a display of a thumbnail image view section adjacent the first image, wherein the thumbnail image view section comprises a set of selectable thumbnail images, wherein individual ones of the selectable thumbnail images of the set depict one of a plurality of views, wherein the individual ones of the selectable thumbnail images have height and width dimensions that are smaller than corresponding height and width dimensions of the first image, and wherein a selection of one of the selectable thumbnail images causes an image of the first item in a view corresponding to the selected one of the selectable thumbnail images to be presented in the image view section.

14. The first computer system of claim 13, wherein the thumbnail image view section is provided below a bottom edge of the first image, and wherein individual ones of the set of selectable thumbnail images are aligned substantially horizontally within the thumbnail image view section.

15. The first computer system of claim 13, wherein a first number of pixels in the first image is greater than numbers of pixels in individual ones of the selectable thumbnail images.

16. The first computer system of claim 4, wherein the first set of instructions further comprises:

instructions for determining a first anchor point within the first image presented in the image view section based at least in part on the portion of the first image; and instructions for selecting the portion of the third image corresponding to the first anchor point.

17. The computer system of claim 4, wherein the first set of instructions further comprises:

instructions for causing a display of a slider section comprising a plurality of thumbnail images, wherein individual ones of the plurality of thumbnail images depict one of a plurality of items, and wherein the first item is one of the plurality of items.

18. A computer-implemented method comprising:

receiving a request for information regarding a first item from a computer device over a network;

in response to the request for information regarding the first item, generating a set of instructions for displaying a web page on a computer display, wherein the set of instructions comprises:

instructions for causing a display of a first image having a first level of resolution in an image view section on a user interface on the computer display, wherein the first image depicts a first view of the first item;

instructions for causing a display of an item detail section adjacent the first image on the user interface, wherein the item detail section comprises a plurality of details regarding the first item, and wherein the plurality of details comprises:

a name of the first item;

a selectable feature for adding at least one of the first item to a virtual shopping cart associated with a customer account in response to a selection; and one or more of: a model number of the first item, a manufacturer of the first item, a price of the first item or a textual description of the first item;

instructions for causing a display of sets of horizontal text, wherein at least one of the sets of horizontal text is displayed above the first image, wherein each of the sets of horizontal text corresponds to one of a plurality of categories, and wherein the first item is in at least one of the plurality of categories;

instructions for causing a display of a thumbnail image section below the first image, wherein the thumbnail image section comprises a set of selectable thumbnail images, wherein individual ones of the selectable thumbnail images depict one of a plurality of views, wherein the first view is one of the plurality of views, wherein the individual ones of the selectable thumbnail images have heights that are smaller than a height of the first image, wherein the individual ones of the selectable thumbnail images have widths that are smaller than a width of the first image, wherein the individual ones of the set of selectable thumbnail images are aligned substantially horizontally within the thumbnail image section, and wherein a selection of one of the selectable thumbnail images causes an image of the first item in a view corresponding to the selected one of the selectable thumbnail images to be presented in the image view section;

instructions for determining that a cursor is over at least a portion of the first image;

instructions for causing a display of a second image of the first item over at least a portion of the item detail section on the user interface in response to determining that the cursor is over the portion of the first image, wherein the second image is a portion of a third image having a second level of resolution, wherein the second level of resolution is greater than the first level of resolution, wherein a height of the third image is greater than the height of the first image, wherein a width of the third image is greater than the width of the first image, wherein the height of the third image is greater than a height of the second image, and wherein the width of the third image is greater than a width of the second image; and instructions for causing a display of a box over the first image while the second image is shown on the computer display, wherein a ratio of a height of the box to the height of the first image is approximately equal to a ratio of the height of the second image to the height of the third image, wherein a ratio of a width of the box to the width of the first image is substantially equal to a ratio of the width of the second image to the width of the third image; and transmitting the set of instructions to the computer device over the network.

19. The computer-implemented method of claim 18, wherein the set of instructions further comprises:

instructions for determining that the cursor is not over any portion of the first image; and instructions for removing the box over the first image in response to determining that the cursor is not over any portion of the first image.

* * * * *